US008693221B2

(12) United States Patent
Ochi et al.

(10) Patent No.: US 8,693,221 B2
(45) Date of Patent: Apr. 8, 2014

(54) ELECTRIC POWER CONVERTER APPARATUS

(75) Inventors: Kenji Ochi, Nishio (JP); Fumio Asakura, Okazaki (JP); Hiroshi Yoshida, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 104 days.

(21) Appl. No.: 13/286,347

(22) Filed: Nov. 1, 2011

(65) Prior Publication Data

US 2012/0106221 A1    May 3, 2012

(30) Foreign Application Priority Data

Nov. 2, 2010    (JP) .................................. 2010-246471

(51) Int. Cl.
*H02M 1/14*    (2006.01)
(52) U.S. Cl.
USPC ............................................. 363/41; 363/98
(58) Field of Classification Search
USPC .................. 363/97, 98, 39, 40–42, 55, 56.01, 363/56.02, 56.03, 56.04, 56.05, 131, 132, 363/95
See application file for complete search history.

(56) References Cited

U.S. PATENT DOCUMENTS

| 5,550,450 | A | * | 8/1996 | Palko et al. | 318/800 |
| 5,811,949 | A | * | 9/1998 | Garces | 318/448 |
| 6,535,402 | B1 | * | 3/2003 | Ying et al. | 363/41 |
| 6,862,199 | B2 | * | 3/2005 | Escobar et al. | 363/41 |
| 7,397,675 | B2 | * | 7/2008 | Neacsu | 363/41 |
| 7,855,901 | B2 | * | 12/2010 | Oyobe et al. | 363/41 |
| 2010/0157632 | A1 | * | 6/2010 | Batten et al. | 363/74 |
| 2011/0058399 | A1 | * | 3/2011 | Honsberg et al. | 363/98 |

FOREIGN PATENT DOCUMENTS

| JP | H03-164071 | | 7/1991 |
| JP | H06-062580 | | 3/1994 |
| JP | H06-062580 | * | 4/1994 |
| JP | 9-47028 | | 2/1997 |
| JP | P2001-352764 | | 12/2001 |
| JP | 2006-174625 | * | 6/2006 |
| JP | P2006-174625 A | | 6/2006 |

OTHER PUBLICATIONS

Japanese Official Action dated Nov. 6, 2012 issued in corresponding Japanese Application No. 2010-246471, with English translation.

* cited by examiner

*Primary Examiner* — Gary L Laxton
*Assistant Examiner* — Kyle J Moody
(74) *Attorney, Agent, or Firm* — Nixon & Vanderhye PC

(57) ABSTRACT

An electric power converter apparatus includes an inverter circuit having a plurality of upper arm elements and a plurality of lower arm elements, a feedback controlling module calculating a voltage command value in order to control an output from the inverter circuit in a feedback control manner and a compensating module compensating the voltage command value with a compensation amount and outputting a compensated voltage command value. Each of the plurality of upper arm elements and the plurality of lower arm elements is operated to switch over based on a control signal that is set according to the compensated voltage command value and a dead time. The compensation amount is set by the compensating module in order to compensate a fluctuation in the output current due to the dead time.

7 Claims, 4 Drawing Sheets

ELECTRIC POWER CONVERTER APPARATUS

CROSS REFERENCE TO RELATED APPLICATIONS

This application is based on Japanese Patent Application No. 2010-246471 filed on Nov. 2, 2010, the disclosures of which are incorporated herein by reference.

TECHNICAL FIELD

The present invention relates to an electric power converter apparatus for converting electric power with compensating a dead time.

BACKGROUND

JP-A-H09-47028 discloses an electric power converter apparatus, in which a limit time (hereafter referred to as dead time) of switching operation is set to prevent a short circuit. The short circuit occurs when a high-side switching element and a low-side switching element in an inverter circuit turn to on-state at the same time. The electric power converter apparatus also provides a compensating function to compensate an insufficient output power due to the dead time. For example, the output power decreases due to the dead time. The compensating function, which compensates electric power error due to the dead time, is referred to as dead time compensation. In JP-A-H09-47028, a compensation voltage is added to a voltage command value to compensate an output voltage decrease due to the dead time. In a case where a current command value has a positive polarity, the compensation voltage is defined as a positive voltage. In a case where a current command value has a negative polarity, the compensation voltage is defined as a negative voltage. According to this conventional art, the output voltage decrease due to the dead time is compensated. Further, near a zero-crossing point of an output current, a distortion in the current waveform is restricted.

A configuration of the electric power converter apparatus according to the conventional art still has a problem that the current waveform distorts substantially due to the switching operation performed by the switching elements in the inverter circuit. Specifically, when the dead time is set to a large value to increase a safety of the electric power converter apparatus, the distortion in the current waveform generated by the switching operation will be generated significantly.

SUMMARY

In view of the foregoing difficulties, it is an object of the present invention to provide an electric power converter apparatus that restricts a current waveform distortion.

According to a first aspect of the present disclosure, an electric power converter apparatus includes an inverter circuit having a plurality of upper arm elements and a plurality of lower arm elements, a feedback controlling module calculating a voltage command value in order to control an output from the inverter circuit in a feedback control manner and a compensating module compensating the voltage command value with a compensation amount and outputting a compensated voltage command value. Each of the plurality of upper arm elements and the plurality of lower arm elements is operated to switch over based on a control signal that is set according to the compensated voltage command value and a dead time. The compensation amount is set by the compensating module according to a polarity of an output current of the inverter circuit and an estimated distortion formed in a waveform of the output current in order to compensate a fluctuation in the output current due to the dead time.

In the above apparatus, the fluctuation in the output current due to the dead time is compensated. Further, since the compensation amount is set according to the estimated distortion formed in the output current, the distortion in the output current is restricted.

According to a second aspect of the present disclosure, an electric power converter apparatus includes an inverter circuit having a plurality of upper arm elements and a plurality of lower arm elements, a feedback controlling module calculating a voltage command value in order to control an output from the inverter circuit in a feedback control manner and a compensating module compensating the voltage command value with a compensation amount and outputting a compensated voltage command value. Each of the plurality of upper arm elements and the plurality of lower arm elements is operated to switch over based on a control signal that is set according to the compensated voltage command value and a dead time. The compensation amount is set by the compensating module according to a polarity of an output current of the inverter circuit and an estimated distortion formed in a waveform of the output current in order to compensate a fluctuation in the output current due to the dead time, and is reduced at an end portion of a half wave of the output current.

In the above apparatus, the fluctuation in the output current due to the dead time is compensated. Further, estimated distortions at the end portion of the half wave of the output current are covered by the compensating module.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Embodiments of the present disclosure will be described with reference to the drawings. In each of the following embodiments, the same reference number is added to the corresponding parts described in a prior embodiment to avoid repetition. In each of the following embodiments, in a case where only a part of an embodiment is described, the other part of this embodiment may apply the similar configuration of other embodiments described prior to this embodiment. In the following embodiments, a certain part, which is described as a part capable of combining with other parts, surely may combine with other parts. Further, a certain part, which is not explicitly described as a part capable of combining with other parts, may also combine with other parts in case that there is no difficulty in the combining.

The present disclosure relates to an electric power converter apparatus, which provides improved dead time compensation, and more specifically to an inverter apparatus, which is connected to a grid power system and provides dead time compensation.

First Embodiment

Figure 1:
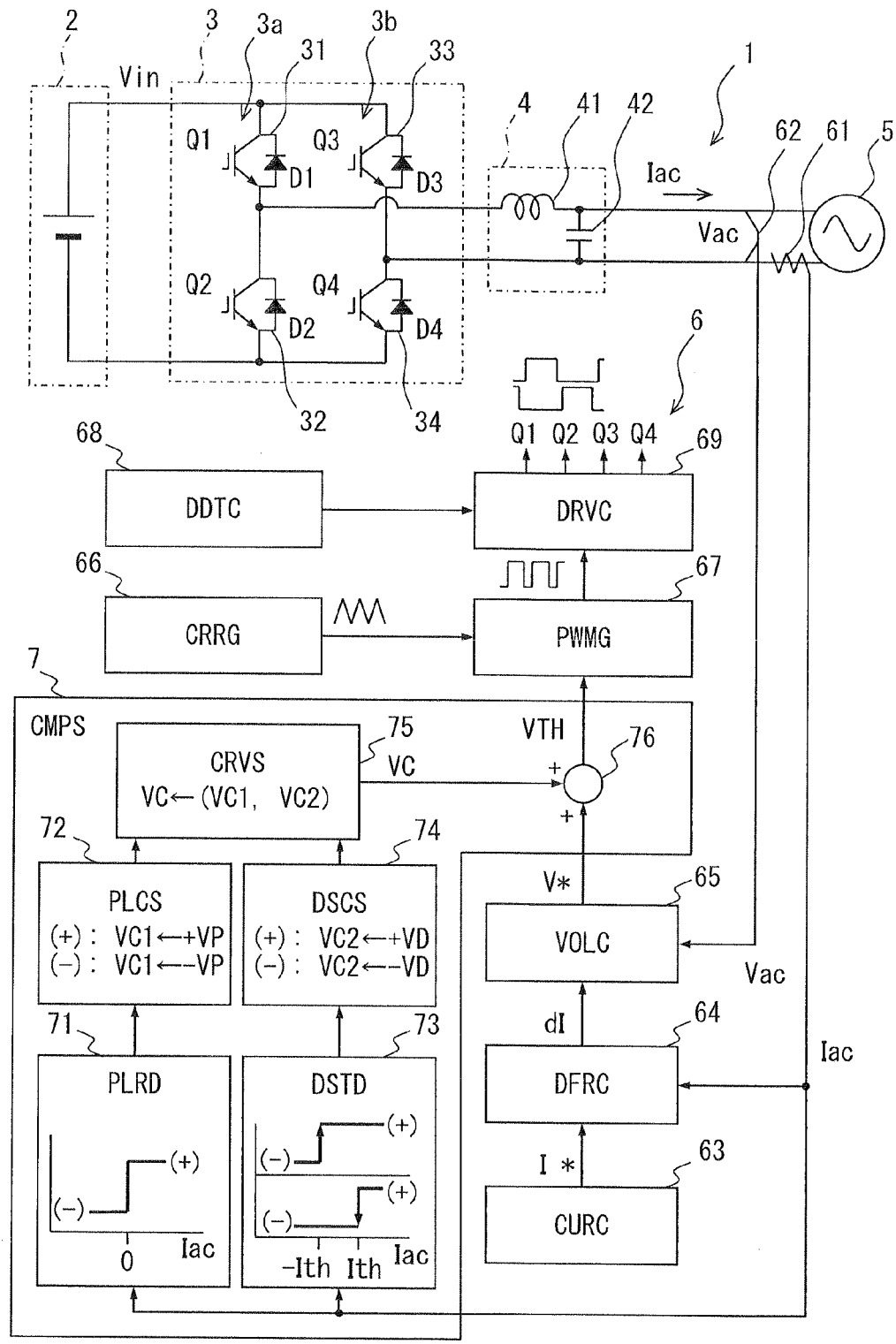
FIG. 1 is a block diagram showing an electric power converter apparatus according to a first embodiment.

As shown in FIG. 1, an electric power converter apparatus 1 provides an electric power source apparatus, which is connected to a grid power system. The electric power converter apparatus 1 includes an electric power source 2, an inverter circuit 3, a filter circuit 4, a grid power network 5 and a controlling module 6. The electric power converter apparatus 1 regenerates an electric power by the electric power source 2 to the grid power network 5. Thus, the electric power converter apparatus 1 converts a DC power supplied by the electric power source 2 to an AC power, which has the same phase with the AC power supplied by the grid power network. The electric power converter apparatus 1 controls an upper-arm element and a lower-arm element to switch over by setting a dead time.

The electric power source 2 supplies a DC current. The electric power source 2 is a distributed electric power source that is provided in a residence of a consumer or a business facility. For example, the electric power source 2 may be provided by a solar power generation apparatus, a fuel battery or a secondary battery. The electric power source 2 may also be provided by an AC power generator, which produces electricity by wind-power or water-power, and a rectifying circuit. Further, the electric power source 2 may have a converter circuit, which regulates a DC current. For example, a step-up chopper circuit may be formed between the solar power generation apparatus and the inverter circuit 3.

The inverter circuit 3 provides a single-phase inverter circuit. The inverter circuit 3 is also referred to as a system connected inverter circuit. The inverter circuit 3 includes a plurality of switching arms 3a and 3b. Each of the switching arms has an upper arm element and a lower arm element, which are connected in series. The switching arm 3a has an upper arm element 31 and a lower arm element 32. The switching arm 3b has an upper arm element 33 and a lower arm element 34. Each of the arm elements 31, 32, 33 and 34 is formed by a switching element and a free wheel diode, which are connected in parallel. Each of the arm elements 31, 32, 33 and 34 includes an IGBT (insulated-gate bipolar transistor). The upper arm element 31 has a transistor Q1 as the switching element and a reversely biased diode D1 as the free wheeling diode. The lower arm element 32 has a transistor Q2 as the switching element and a reversely biased diode D2 as the free wheeling diode. The upper arm element 33 has a transistor Q3 as the switching element and a reversely biased diode D3 as the free wheeling diode. The lower arm element 34 has a transistor Q4 as the switching element and a reversely biased diode D4 as the free wheeling diode.

The filter circuit 4 includes an inductance element 41 and a capacitance element 42, which form an LC filter. The filter circuit 4 suppresses noise transfer from the inverter circuit 3 to the grid power network 5.

The grid power network 5 is an AC power network. The grid power network is a commercial electric power system or a private electric power system provided by an electric power provider. An electric power breaker, which protects the grid power system, may be formed between the filter circuit 4 and the grid power network 5.

The controlling module 6 is provided by a microcomputer equipped with a computer readable storage medium. A computer readable program is stored on the storage medium. The storage medium may be provided by a memory. The controlling module 6 executes the program stored on the storage medium so that the controlling module 6 functions as a functional module described in this specification, and executes a controlling method described in this specification. The controlling module 6 may also be referred to as a functional block or a functional module, which performs a predetermined function.

The controlling module 6 includes a current detecting sensor 61 and a voltage detecting sensor 62. The current detecting sensor 61 detects an output current Iac. The voltage detecting sensor 62 detects an output voltage Vac. The current detecting sensor 61 and the voltage detecting sensor 62 are formed between the filter circuit 4 and the grid power network 5. The controlling module 6 is provided as an inverter controlling module to control the inverter circuit 3 in such a manner that the inverter circuit 3 supplies a regulated AC power to the grid power network 5. The regulated AC power supplied by the inverter circuit 3 has the same frequency and phase with an AC power supplied by the grid power system. The controlling module 6 modulates a duty ratio of a switching signal for the inverter circuit 3 based on the output current Iac and the output voltage Vac to obtain a target current and a target voltage as outputs. The controlling module 6 is formed as a current-control circuit, which outputs a predetermined current. The inverter circuit 3 and the controlling module 6 form an inverter apparatus connected to the grid power system.

The controlling module 6 includes a current command value calculating block (CURC) 63, a difference calculating block (DFRC) 64, a voltage command value calculating block (VOLC) 65 and a compensating module (CMPS) 7. The controlling module 6 further includes a carrier generating block (CRRG) 66, a PWM signal generating block (PWMG) 67, a dead time generating block (DDTC) 68 and a driving circuit block (DRVC) 69.

The current command value calculating block 63 outputs an AC current command value I*. The current command value I* is set to have the same frequency and phase with the grid power network 5. The difference calculating block 64 calculates a current difference dI between the current command value I* and the output current Iac using a formula $dI = I^* - Iac$. The voltage command value calculating block 65 calculates a voltage command value V* based on the current difference dI and the output voltage Vac. The blocks 63, 64, 65 and the detecting sensors 61 and 62 provide a feedback controlling module, which calculates the voltage command value V* to control a feedback of the output current Iac output from the inverter circuit 3 to the current command value I*. The feedback controlling module is provided by a proportional integral controller (PI controller). The voltage command value V* is compensated by the compensating module 7, and a compensated voltage command value VTH is output.

The carrier generating block 66 outputs a triangle wave as a carrier. The carrier and the compensated voltage command value VTH are input to the PWM signal generating block 67. The PWM signal generating block 67 compares the carrier and the compensated voltage command value VTH, and outputs a pulse width modulated signal (hereafter referred to as PWM signal), which has a duty ratio correspondent to the compensated voltage command value VTH. The dead time generating block 68 sets a predetermined dead time. The dead time, a time period of low-level signal, is added to the control signals for the upper arm element and the lower arm element, which form a switching arm, to prevent the upper arm element and the lower arm element from turning to on-state at the same time. The driving circuit block 69 outputs control signals to control the transistors Q1, Q2, Q3, Q4 formed in the arm elements 31, 32, 33, 34 based on the PWM signal and the dead time. When the driving circuit block 69 inverts the control signal for the transistor formed in the upper arm element and the control signal for the transistor formed in the lower arm element, the dead time is added to the control signals for the two transistors Q1 and Q2 to set the two transistors Q1 and Q2 to off-state.

The compensating module 7 includes a polarity determination block (PLRD) 71, a polarity component setting block (PLCS) 72, a distortion detecting block (DSTD) 73, a distortion component setting block (DSCS) 74, a compensation amount setting block (CRVS) 75 and an adder block 76. The compensating module 7 sets a compensation amount VC to compensate a fluctuation in the output voltage Vac and/or output current Iac due to the dead time. Further, compensating module 7 compensates the voltage command value V* with the compensation amount VC, and outputs the compensated voltage command value VTH. The compensating module 7 provides a compensating function.

The polarity determination block 71 determines a polarity of the output current Iac. The polarity determination block 71 provides a polarity determination function. The polarity component setting block 72 sets a polarity component VC1 of the compensation amount according to the polarity of the output current Iac. When the polarity of the output current Iac is positive (+), the polarity component VC1 is set to a positive predetermined voltage +VP. The predetermined voltage +VP increases the output of the inverter circuit 3 in the positive direction. When the polarity of the output current Iac is negative (−), the polarity component VC1 is set to a negative predetermined voltage −VP. The predetermined voltage −VP increases the output of the inverter circuit 3 in the negative direction. The polarity component setting block 72 provides a polarity component setting function. The blocks 71 and 72, as a first setting unit, provide a first setting function of the polarity component VC1 according to the polarity of the output current Iac.

The distortion detecting block 73 detects an estimated point of a predetermined distortion occurrence in a waveform of the output current Iac. In the waveform of the output current Iac, a region between a peak point, such as an extreme top or bottom, and a zero-crossing point is detected by the distortion detecting block 73 if a distortion occurs. The zero-crossing point is a point at which a signal passes across a zero point from a negative side to a positive side or from the positive side to the negative side. That is, the signal zero-crosses at the zero-crossing point. The distortion detecting block 73 detects an estimated point of a distortion DST+, which occurs when the output current Iac increases, and detects an estimated point of a distortion DST−, which occurs when the output current Iac decreases. Specifically, the distortion detecting block 73 recognizes a characteristic shape of a distortion in the detection region of the output current Iac waveform, and detects the estimated point of the distortion. In the present embodiment, the distortions DST+ and DST− occur at points when the output current Iac decreases to a predetermined value +Ith, or increases to a predetermined value −Ith. Therefore, occurrences of the distortions DST+ and DST− and occurrence points of the distortions DST+ and DST− are detected by combining an increase/decrease determination of the output current Iac and a comparing determination of the output current Iac with the predetermined current values +Ith and −Ith. The distortion detecting block 73 turns to a detecting state (+) of distortion DST+ when the output current Iac increases to a value larger than the predetermined current value −Ith. The distortion detecting block 73 turns to a detecting state (−) of distortion DST− when the output current Iac decreases to a value smaller than the predetermined current value +Ith. The distortion detecting block 73 provides a distortion detecting function.

The distortion component setting block 74 sets a distortion component VC2 of the compensation amount according to the detected distortion. The distortion component VC2 is set to a positive predetermined voltage +VD when the distortion DST+ is detected. The predetermined voltage +VD increases the output of the inverter circuit 3 in the positive direction. The distortion component VC2 is set to a negative predetermined voltage −VD when the distortion DST− is detected. The predetermined voltage −VD increases the output of the inverter circuit 3 in the negative direction. The distortion component setting block 74 provides a distortion component setting function. The blocks 73 and 74, as a second setting unit, provide a second setting function of the distortion component VC2 according to the estimated increasing distortion DST+, which occurs when the output current Iac increases, and the estimated decreasing distortion DST−, which occurs when the output current Iac decreases.

The compensation amount setting block 75 sets the compensation amount VC according to the polarity component VC1 and the distortion component VC2. The compensation amount setting block 75 calculates the compensation amount VC by adding the polarity component VC1 and the distortion component VC2. The compensation amount VC is controlled between a maximum value +Vm and a minimum value −Vm. The maximum value +Vm of the compensation amount VC and the minimum value −Vm of the compensation amount VC are set to values which do not cause excess dead time compensation. The compensation amount setting block 75 provides a compensation amount setting function of the compensation amount VC according to the polarity component VC1 and the distortion component VC2. The adder block 76 adds the compensation amount VC to the voltage command value V*, and outputs the compensated voltage command value VTH.

Figure 2:
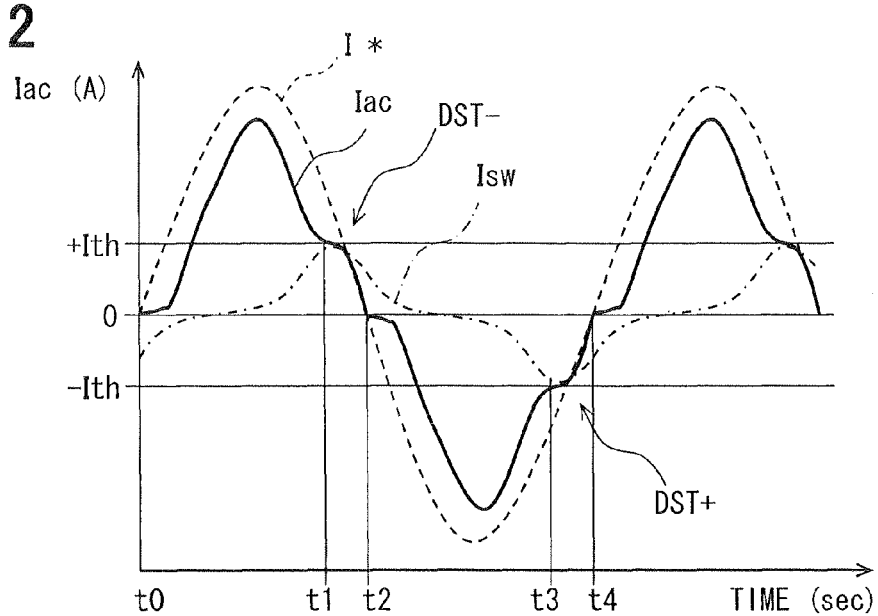
FIG. 2 is a waveform diagram of an output current to describe an operation of the electric power converter apparatus according to the first embodiment.

In FIG. 2, the voltage command value I* is shown by a dashed line. The voltage command value I* is a sinusoidal current with zero-crossing points at a t2 point and a t4 point. The output current Iac is shown by a solid line. A delayed current Isw, which is a virtual current estimated in a case where the reversely biased diodes D1, D2, D3 and D4 are not formed in the arm elements, is shown by a dashed-dotted line. The output current Iac shown in this figure is detected in a condition that the dead time is set to a large value and dead time compensation is not performed. When the dead time is set, current will flow through the diodes D1, D2, D3 and D4 during the dead time. Therefore, the output voltage becomes smaller than the target voltage, and the output current Iac becomes smaller than the current command value I*. For example, when one of the switching arms outputs a positive current, the diode formed in the lower arm element is conductive. Thus, the switching arm outputs a negative voltage during the dead time. Therefore, a time period during which the switching arm outputs the positive voltage is decreased, and the decreased time is equal to the dead time. In contrast, when the switching arms outputs a negative current, the diode formed in the upper arm element is conductive. Thus, the switching arm outputs a positive voltage during the dead time. Therefore, a time period during which the switching arm outputs the negative voltage is decreased, and the decreased time is equal to the dead time. As a result, the output voltage decreases due to the dead time.

The output voltage decreases substantially when the dead time is set to a large value. As shown in FIG. 2, when the dead time is set to a large value, substantial distortions DST+ and DST− will be formed in the output current Iac. The distortions DST+ and DST− become more significant with a larger (longer) dead time. The distortions DST+ and DST− are caused by the delayed current Isw. The delayed current Isw is a current component when the transistors Q1, Q2, Q3 and Q4 are controlled to switch over by the PWM signal without the diodes D1, D2, D3 and D4. Thus, the distortions DST+ and DST− are characterized by an extreme value of the delayed current Isw. An extreme top value +Ith and an extreme bottom value −Ith are used as an extreme value of the delayed current Isw. The distortion DST− occurs when the output current Iac decreases. The distortion DST+ occurs when the output current Iac increases. In a case shown in FIG. 2, the distortion DST− occurs at a t1 point, and the distortion DST+ occurs at a t3 point.

In the present embodiment, the polarity component VC1 is set according to the polarity of the output current Iac to compensate a voltage decrease due to the dead time. Additionally, the distortion component VC2 is set according to the estimated distortions DST+ and DST− to restrict the distortions DST+ and DST−.

Figure 3:
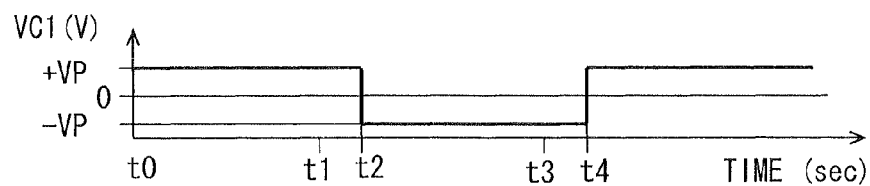
FIG. 3 is a waveform diagram of a polarity component of a dead time compensation amount according to the first embodiment.

As shown in FIG. 3, the polarity component VC1 inverts from +VP to −VP at the point t2, at which the output current Iac zero-crosses from the positive to the negative. Further, the polarity component VC1 inverts from −VP to +VP at the point t4, at which the output current Iac zero-crosses from the negative to the positive. As a result, the polarity component VC1 is set to have the same phase with the output current Iac.

Figure 4:
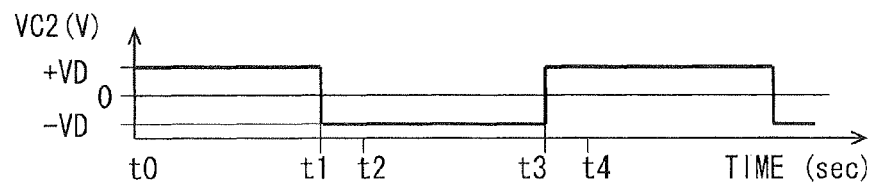
FIG. 4 is a waveform diagram of a distortion in the dead time compensation amount according to the first embodiment.

As shown in FIG. 4, the distortion component VC2 inverts from +VD to −VD at the point t1, at which the output current Iac decreases to a value smaller than the predetermined current value +Ith. Further, the distortion component VC2 inverts from −VD to +VD at the point t3, at which the output current Iac increases to a value larger than the predetermined current value −Ith. The distortion component VC2 has an advanced phase compared with the polarity component VC1. The phase of the distortion component VC2 is advanced compared with the phase of the polarity component VC1 by a time period between the estimated occurrence time of the distortion DST+ or the distortion DST− and the zero-crossing point. It is also said that the distortion component VC2 is set to have a slightly advanced phase compared with the output current Iac.

Figure 5:
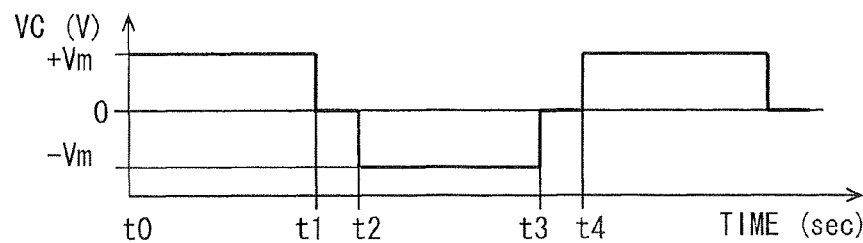
FIG. 5 is a waveform diagram of the dead time compensation amount according to the first embodiment.

As shown in FIG. 5, the compensation amount VC is set in a stepwise manner. The compensation amount VC is set to have a slightly advanced phase compared with the output current Iac. The compensation amount VC is a sum of the polarity component VC1 and the distortion component VC2. The compensation amount VC is set to a value close to zero from a maximum value +Vm or a minimum value −Vm before the output current Iac zero-crosses.

In the present embodiment, an absolute value of the polarity component VC1 and an absolute value of the distortion component VC2 are set to have the same value. Therefore, the compensation amount VC is set to zero before the output current Iac zero-crosses. Specifically, the compensation amount VC changes from the maximum value +Vm to zero at the point t1, which is earlier than the zero-crossing point t2 of the output current Iac. That is, the compensation amount VC is decreased in the negative direction when the distortion DST− occurs. That is, the compensation amount, which is configured to increase output voltage in the positive direction, decreases. The distortion DST− is shown as a convex shape in the positive direction in the waveform of the output current Iac. As a result of the dead time compensation, the output current is changed in such a manner that the output current covers the distortion DST−, which has a convex shape in the positive direction. Then, the compensation amount VC changes from zero to the minimum value −Vm at the zero-crossing point t2 of the output current Iac. Further, the compensation amount VC changes from the minimum value −Vm to zero at the point t3, which is earlier than the zero-crossing point t4 of the output current Iac. That is, the compensation amount VC is decreased in the positive direction when the distortion DST+ occurs. That is, the compensation amount, which is configured to increase output voltage in the negative direction, decreases. The distortion DST+ is shown as a convex shape in the negative direction in the waveform of the output current Iac. As a result of the dead time compensation, the output current is changed in such a manner that the output current covers the distortion DST+, which has a convex shape in the negative direction.

The compensation amount VC is restricted to a small value during estimated time periods during the distortions DST+ and DST− are shown significantly. There are two estimated time periods t1 to t2 and t3 to t4. The time period t1 to t2 is between the estimated occurrence time t1 of the distortion DST− and the zero-crossing point t2. The time period t3 to t4 is between the estimated occurrence time t3 of the distortion DST+ and the zero-crossing point t4. During the estimated time periods of the distortions, the compensation amount VC is set to a value close to zero (i.e. a small value) from the maximum value +Vm or the minimum value −Vm. Thus, the compensation amount VC is restricted by the compensating module 7 during the estimated time period t1 to t2 of the distortion DST+ occurrence and the estimated time period t3 to t4 of the distortion DST− occurrence.

The compensation amount VC is set to a large value during time periods when the distortion DST+ and DST− are not shown significantly. There are two time periods t0 to t1 and t2 to t3. The time period t0 to t1 is between the zero-crossing point t0 and the point t1, which is earlier than the subsequent zero-crossing point t2 and later than a point when the output current Iac reaches an extreme value. The time period t2 to t3 is between the zero-crossing point t2 and the point t3, which is earlier than the subsequent zero-crossing point t4 and later than a point when the output current Iac reaches an extreme value.

Consequently, the compensation amount VC is restricted only at an end portion in a latter part of a half wave of the output current Iac. That is, the compensation amount VC is set to a small value at the end portion of the half wave. In contrast, the compensation amount VC is not restricted at the other portion other than the end portion in the half wave of the output current Iac. That is, the compensation amount VC is set to a large value at the other portion of the half wave. Therefore, the compensation amount VC, which has above-described waveform shape, compensates an output difference due to the dead time, and also covers the distortions.

Figure 6:
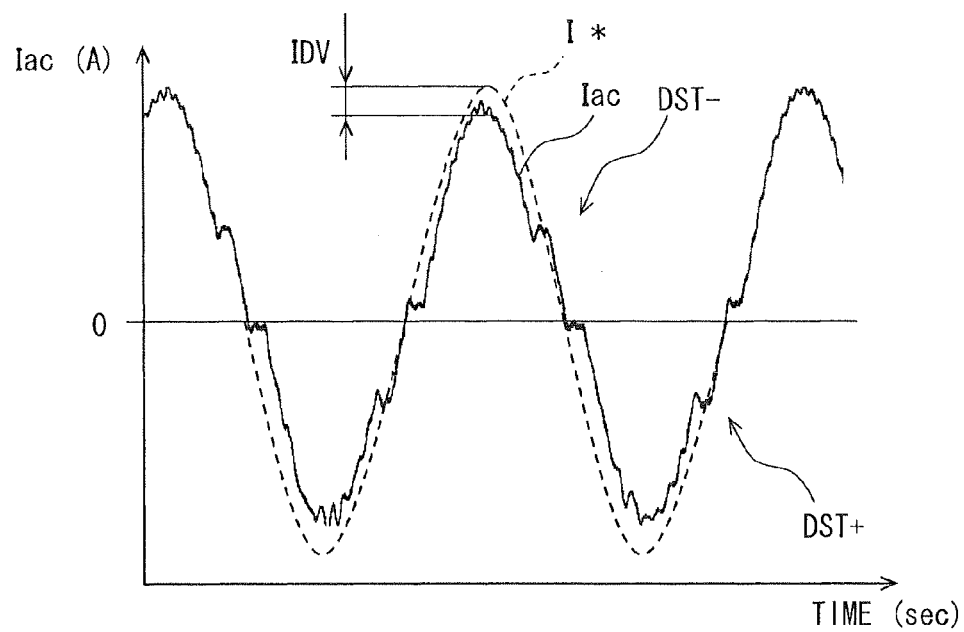
FIG. 6 is a waveform diagram of an output current according to a first comparison example.

As shown in FIG. 6, in a first comparison example, the compensating module 7 is not provided in the electric power converter apparatus. In this comparison example, the output current Iac is smaller than the current command value I* due to the dead time. A current difference IDV between the current command value I* and the output current Iac is caused by a decreased output voltage due to the dead time. Further, since the dead time is set to a relatively large value, distortions DST+ and DST− are shown significantly.

Figure 7:
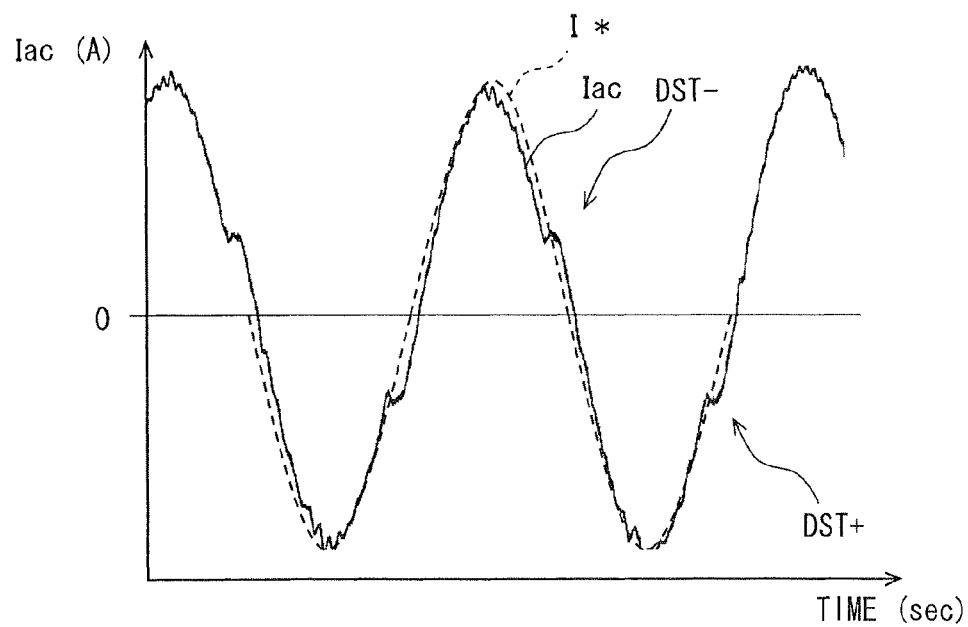
FIG. 7 is a waveform diagram of an output current according to a second comparison example.

As shown in FIG. 7, in a second comparison example, the distortion detecting block 73 and the distortion component setting block 74 are not provided in the compensating module 7 of the electric power converter apparatus. In this comparison example, only the polarity component VC1, which has the same phase with the output current Iac, is provided by the polarity determination block 71 and the polarity component setting block 72. According to this comparison example, almost all of the current difference between the current command value I* and the output current Iac due to the dead time is compensated. Further, almost all of the distortions occurring near the zero-crossing points are compensated. However, the distortions DST+ and DST− are left significantly without compensated.

Figure 8:
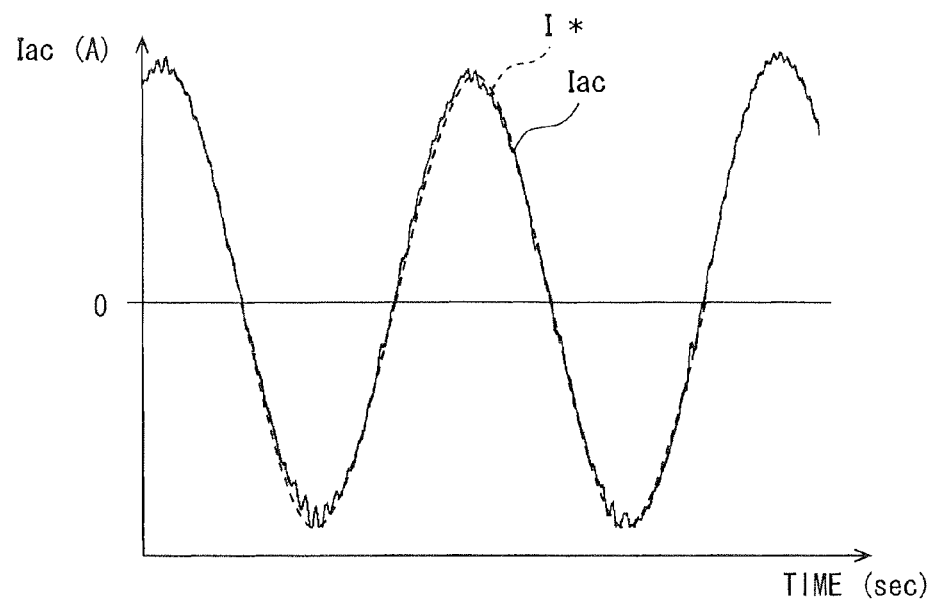
FIG. 8 is a waveform diagram of an output current according to the first embodiment.

As shown in FIG. 8, according to the configuration disclosed in the first embodiment, an advanced phase component, which is included in the distortion component VC2 but not included in the polarity component VC1, is added to the output current Iac. As a result, both the distortion DST−, which occurs when the output current Iac decreases, and the distortion DST+, which occurs when the output current Iac increases, are restricted.

As described, in the present embodiment, a feedback control to the inverter circuit 3 is carried out so that the output current Iac has the same phase with the current command value I*. Further, the compensation amount VC is provided by the compensating module 7 to compensate a static difference due to the dead time. The compensation amount VC includes the polarity component VC1, which is set in accordance with the polarity of the output current Iac, and the distortion component VC2, which is set in accordance with the estimated distortions DST+ and DST− formed in the output current Iac. That is, compensation components, which are provided to cover the distortions DST+ and DST− when the distortions DST+ and DST− occur, are added to the compensation amount VC. That is, the distortion component VC2, which has the advanced phase compared with the polarity component VC1, is added to the compensation amount VC. As a result, a fluctuation that is not compensated only by the polarity component VC1 is compensated by the compensation amount VC. Specifically, the distortions formed in the waveform of the output current Iac are restricted.

The electric power converter apparatus, which is connected to the grid power system, is required to restrict a high-harmonic to not degrade a quality of the grid power network 5. For example, a distortion ratio of the whole high-harmonics is required to be 5% at maximum output according to an official index. According to the present embodiment, the distortion ratio is 3.2%. However, in the second comparison example, the distortion ratio is 6.4%.

According to the present embodiment, the distortion ratio of the high-harmonics is restricted even when the dead time is set to a large value.

Second Embodiment

Figure 9:
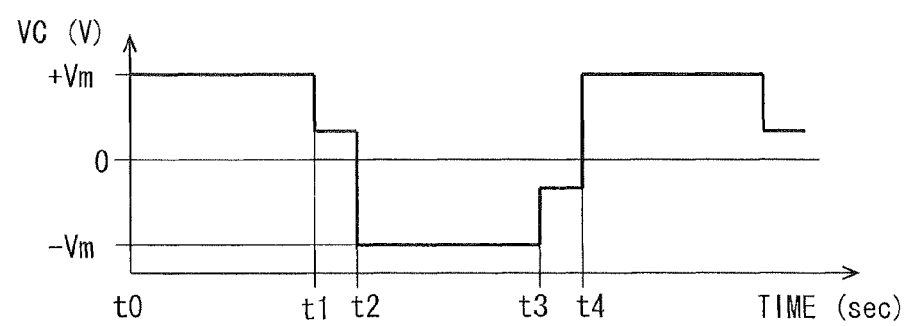
FIG. 9 is a waveform diagram of a dead time compensation amount according to a second embodiment.

In the forgoing embodiment, the absolute value |VP| of the polarity component VC1 and absolute value |VD| of the distortion component VC2 are set to have the same value. Alternatively, the absolute value |VP| of the polarity component VC1 may be set differently form the absolute value |VD| of the distortion component VC2. For example, the absolute value |VP| may be set larger than the absolute value |VD| or the absolute value |VP| may be set smaller than the absolute value |VD|. As shown in FIG. 9, the absolute value |VP| is set larger than the absolute value |VD|. A ratio of the absolute value |VP| to the absolute value |VD| may be set according to the waveform of the output current Iac. For example, the ratio of the absolute value |VP| to the absolute value |VD| may be set according to at least one characteristic of the electric power source 2, the inverter circuit 3, the filter circuit 4 or the grid power network 5. Further, the ratio of the absolute value |VP| to the absolute value |VD| may be variable according to the frequency, phase and absolute value of the output current Iac. According to the present embodiment, a ratio of the polarity component to the distortion component may be set unsymmetrically or may be variable. As a result, the distortions formed in the waveform of the output current Iac are restricted with certainty.

Other Embodiments

The controlling module 6 may be configured to control the inverter circuit 3 so that the current flows from the grid power network 5 to the electric power source 2.

In the forgoing embodiments, the present disclosure is applied to a single-phase grid power network 5. Alternatively, the present disclosure may also be applied to a multi-phase grid power network 5. For example, when the grid power network 5 is three-phased, a three-phase inverter circuit is used instead of the inverter circuit 3 disclosed in the forgoing embodiments.

In the forgoing embodiments, the polarity determination block 71 determines the polarity according to the polarity of the output current Iac. Alternatively, the polarity determination block 71 may be configured to determine the polarity according to the current command value I*.

In the forgoing embodiments, the polarity component VC1 and/or the distortion component VC2 may be variable according to the frequency, phase and the absolute value of the output current Iac.

The controlling function of the controlling module may be provided only by hardware or only by software or by combination of hardware and software. For example, the controlling module may be provided by an analogue circuit.

The above disclosure has the following aspects.

According to an aspect of the present disclosure, an electric power converter apparatus includes an inverter circuit having a plurality of upper arm elements and a plurality of lower arm elements, a feedback controlling module calculating a voltage command value in order to control an output from the inverter circuit in a feedback control manner and a compensating module compensating the voltage command value with a compensation amount and outputting a compensated voltage command value. Each of the plurality of upper arm elements and the plurality of lower arm elements is operated to switch over based on a control signal that is set according to the compensated voltage command value and a dead time. The compensation amount is set by the compensating module according to a polarity of an output current of the inverter circuit and an estimated distortion formed in a waveform of the output current in order to compensate a fluctuation in the output current due to the dead time.

In the above apparatus, the fluctuation in the output current due to the dead time is compensated. Further, since the compensation amount is set according to the estimated distortion formed in the output current, the distortion in the output current is restricted.

Alternatively, the compensation amount may be reduced during an estimated period of distortion occurrence in the waveform of the output current. In this case, during a time period other than the estimated period of distortion occurrence, the voltage command value is compensated by the compensation amount. Thus, the fluctuation in the output current due to the dead time is compensated. Further, the distortion in the output current is covered by the compensation amount.

According to another aspect of the present disclosure, the dead time is added to the control signal to prevent one upper arm element and a corresponding lower arm element from turning on at the same time, and the one upper arm element and the corresponding lower arm element are connected in series. In this case, since dead time is added to the control signal to prevent one upper arm element and a corresponding lower arm, which are connected in series, a short circuit is prevented from occurring.

According to another aspect of the present disclosure, an electric power converter apparatus includes an inverter circuit having a plurality of upper arm elements and a plurality of lower arm elements, a feedback controlling module calculating a voltage command value in order to control an output from the inverter circuit in a feedback control manner and a compensating module compensating the voltage command value with a compensation amount and outputting a compensated voltage command value. Each of the plurality of upper arm elements and the plurality of lower arm elements is operated to switch over based on a control signal that is set according to the compensated voltage command value and a dead time. The compensation amount is set by the compensating module according to a polarity of an output current of the inverter circuit and an estimated distortion formed in a waveform of the output current in order to compensate a fluctuation in the output current due to the dead time, and is reduced at an end portion of a half wave of the output current.

In the above apparatus, the fluctuation in the output current due to the dead time is compensated. Further, estimated distortions at the end portion of the half wave of the output current are covered by the compensating module.

Alternatively, the compensating module may include a first setting unit that sets a polarity component according to the polarity of the output current, a second setting unit that sets a distortion component according to an increasing distortion, which occurs when the output current increases, and a decreasing distortion, which occurs when the output current decreases and a compensation amount setting block that sets the compensation amount according to the polarity component and the distortion component. In this case, the compensation amount is set based on the polarity component according to the polarity of the output current and the distortion component according to the distortion in the output current.

Alternatively, the first setting unit may include a polarity determination block that determines the polarity of the output current and a polarity component setting block that sets a positive polarity component to increase the output from the inverter circuit in a positive direction in a case where the polarity of the output current is positive, and sets a negative polarity component to increase the output from the inverter circuit in a negative direction in a case where the polarity of the output current is negative. In this case the compensation amount is set based on the polarity component according to the polarity of the output current.

Alternatively, the second setting unit may include a distortion detecting block that detects an estimated occurrence time of the increasing distortion and an estimated occurrence time of the decreasing distortion and a distortion component setting block that sets a positive distortion component to increase the output from the inverter circuit in the positive direction in a case where the increasing distortion is detected, and sets a negative distortion component to increase the output from the inverter circuit in a negative direction in a case where the decreasing distortion is detected. In this case, the compensation amount is set based on the distortion component according to the distortion in the output current.

Alternatively, the polarity component may have a same phase with the output current and the distortion component may have an advanced phase compared with the polarity component. In this case, a distortion due to a delayed component is compensated by a distortion component which has the advanced phase compared with the polarity component.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An electric power converter apparatus comprising:
    an inverter circuit having a plurality of upper arm elements and a plurality of lower arm elements, the inverter circuit being a single-phase system connected inverter circuit;
    a feedback controlling module calculating a voltage command value in order to control an output from the inverter circuit in a feedback control manner; and
    a compensating module compensating the voltage command value with a compensation amount and outputting a compensated voltage command value,
    wherein each of the plurality of upper arm elements and the plurality of lower arm elements is operated to switch over based on a control signal that is set according to the compensated voltage command value and a dead time,
    wherein the compensation amount is set by the compensating module according to a polarity of an output current of the inverter circuit and an estimated distortion formed in a waveform of the output current in order to compensate a fluctuation in the output current due to the dead time,
    wherein the compensation amount is reduced during an estimated period of distortion occurrence in the waveform of the output current, and
    wherein the estimated period of distortion occurrence starts at a point when an absolute value of the output current decreases to a predetermined current value and ends at a point when the absolute value of the output current decreases to zero.

2. The electric power converter apparatus according to claim 1,
    wherein the dead time is added to the control signal to prevent one upper arm element and a corresponding lower arm element from turning on at a same time, and
    wherein the one upper arm element and the corresponding lower arm element are connected in series.

3. The electric power converter apparatus according to claim 1,
wherein the compensating module comprises:
a first setting unit that sets a polarity component according to the polarity of the output current;
a second setting unit that sets a distortion component according to an increasing distortion, which occurs when the output current increases, and a decreasing distortion, which occurs when the output current decreases; and
a compensation amount setting block that sets the compensation amount according to the polarity component and the distortion component.

4. The electric power converter apparatus according to claim 3,
wherein the first setting unit comprises:
a polarity determination block that determines the polarity of the output current; and
a polarity component setting block that sets a positive polarity component to increase the output from the inverter circuit in a positive direction in a case where the polarity of the output current is positive, and sets a negative polarity component to increase the output from the inverter circuit in a negative direction in a case where the polarity of the output current is negative.

5. The electric power converter apparatus according to claim 3,
wherein the second setting unit comprises:
a distortion detecting block that detects an estimated occurrence time of the increasing distortion and an estimated occurrence time of the decreasing distortion; and
a distortion component setting block that sets a positive distortion component to increase the output from the inverter circuit in a positive direction in a case where the increasing distortion is detected, and sets a negative distortion component to increase the output from the inverter circuit in a negative direction in a case where the decreasing distortion is detected.

6. The electric power converter apparatus according to claim 3,
wherein the polarity component has a same phase with the output current, and
wherein the distortion component has an advanced phase compared with the polarity component.

7. An electric power converter apparatus comprising:
an inverter circuit having a plurality of upper arm elements and a plurality of lower arm elements, the inverter circuit being a single-phase system connected inverter circuit;
a feedback controlling module calculating a voltage command value in order to control an output from the inverter circuit in a feedback control manner; and
a compensating module compensating the voltage command value with a compensation amount and outputting a compensated voltage command value,
wherein each of the plurality of upper arm elements and the plurality of lower arm elements is operated to switch over based on a control signal that is set according to the compensated voltage command value and a dead time,
wherein the compensation amount is set by the compensating module according to a polarity of an output current of the inverter circuit and an estimated distortion formed in a waveform of the output current in order to compensate a fluctuation in the output current due to the dead time,
wherein the compensation amount is reduced throughout an end portion of a half wave of the output current, and
wherein the end portion of the half wave of the output current starts at a point when an absolute value of the output current decreases to a predetermined current value,
wherein the end portion of the half wave of the output current ends at a point when the absolute value of the output current decreases to zero.

\* \* \* \* \*